Nov. 8, 1960 J. P. ECKERT, JR 2,959,687

SWITCHING DEVICES

Filed Sept. 21, 1956 2 Sheets-Sheet 1

INVENTOR.
J. P. Eckert, Jr.
BY
Charles C. English
AGENT

| | A | B | Sum | Carry |
|---|---|---|---|---|
| ① | 0 | 0 | 0 | 0 |
| ② | 1 | 0 | 1 | 0 |
| ③ | 0 | 1 | 1 | 0 |
| ④ | 1 | 1 | 0 | 1 |

INVENTOR.
J. P. Eckert, Jr.
BY
Charles G. English
AGENT

United States Patent Office 2,959,687

Patented Nov. 8, 1960

2,959,687

SWITCHING DEVICES

John Presper Eckert, Jr., Gladwyne, Pa., assignor to Sperry Rand Corporation, New York, N.Y., a corporation of Delaware Filed Sept. 21, 1956, Ser. No. 611,254

1 Claim. (Cl. 307—88.5)

The present invention relates to improved switching elements such as may be employed in the construction of various logical networks, computing and control circuits, and is more particularly concerned with switching devices and circuits utilizing such devices which are simpler in construction, and more reliable and efficient in operation, than structures suggested heretofore.

As is well known, various logical circuits, such as may be employed in general switching, control, and computation applications, often employ pulse-responsive devices of various types, and these devices are in turn interconnected in various configurations whereby a desired ultimate circuit may be produced. The switching devices utilized heretofore have been subject to a number of disadvantages; and in particular, these prior devices have often been complex and costly and have, by their very construction, imposed limitations upon the circuit configurations which may be effected.

The present invention serves to obviate these difficulties, and is primarily concerned with improved switching elements which are more versatile than prior high speed electronic devices, and in which the switching device provides a plurality of floating potential contact points which can be interconnected in desired circuit configurations thereby to produce various logical arrays similar to those produced by electromechanical relays utilized in the past.

It is accordingly an object of the present invention to provide an improved switching element.

Another object of the present invention resides in the provision of switching devices providing floating potential contact points whereby the said contacts may be interconnected in logical arrays more readily than has been the case with prior switching elements.

A still further object of the present invention resides in the provision of an improved switching device which has an amplifying characteristic whereby the switches themselves serve to compensate for circuit losses in an overall logical configuration.

Still another object of the present invention resides in the provision of improved switching devices which are simpler in construction, more rugged in configuration and which can be made in smaller sizes than other devices suggested heretofore.

In providing for the foregoing objects and advantages, the present invention contemplates the provision of an improved switching element comprising a core of magnetic material having at least one input winding and at least one output winding thereon. As will be discussed, the said core may comprise a material having either a substantially rectangular or a substantially linear hysteresis loop; and in a preferred embodiment of the invention, the basic switching element includes a plurality of output windings coupled to such a core. The switching element further includes a plurality of transistors coupled respectively to the aforementioned output windings, and in one embodiment of the invention, each such transistor has two electrodes thereof, e.g., the base and emitter, connected to opposing ends of a given output winding whereby one of the said two electrodes and the third electrode, e.g. the emitter and collector, may act as output terminals or floating contact points.

In essence, therefore, each switch unit comprising the present invention serves to provide a plurality of floating contact points, and the pairs of the said contacts tend to become "closed" unidirectionally in response to an input signal at the input winding associated with the switching unit. Plural such switching units may accordingly be interconnected quite readily in various logical configurations; and in particular, transistors in plural such switching elements may be interconnected to effect both buffing and gating circuits whereby any logical device can be constructed by appropriate interconnection of such buffing and gating circuits.

The foregoing objects, advantages, construction and operation of the present invention will become more readily apparent from the following description and accompanying drawings, in which.

Figure 1:
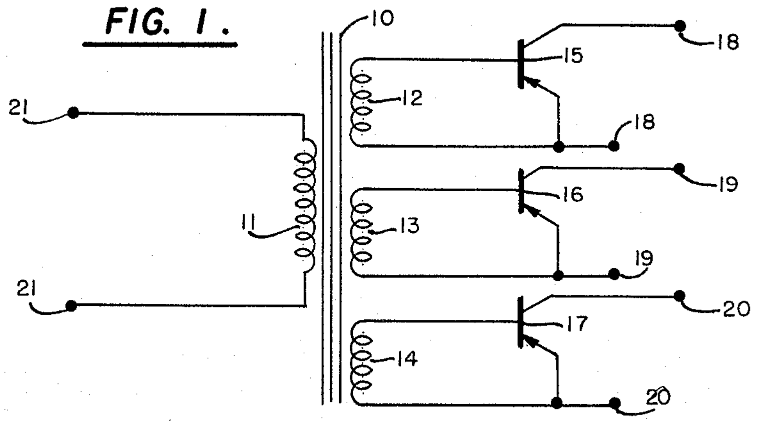
Figure 1 is a schematic diagram of a typical switching unit constructed in accordance with the present invention.

Referring now to Figure 1, it will be seen that in accordance with the present invention, a typical switching unit may comprise a transformer having a magnetic core 10, at least one input winding 11 and one or more output windings, illustrated as 12, 13 and 14. It will be appreciated that more than one input winding 11 can in fact be provided whereby the switching unit is adapted to respond to diverse signals from various sources; and similarly, it will be appreciated that the three output windings 12 through 14 are meant to be merely illustrative and that in fact more or less than three windings can be provided and/or utilized, as may be desired.

In the particular arrangement of Figure 1, each of the output windings 12, 13 and 14 is connected at its opposing ends to a transistor such as 15, 16 and 17; and for the particular switching unit of Figure 1, the opposing ends of each output winding are connected between the base and emitter of one of the said transistors. The emitter and collector of each transistor are brought out to provide "contact" terminals, which are floating in nature; and in particular, transistor 15 provides two contacts 18, transistor 16 provides two contacts 19, and transistor 17 provides two contacts 20.

In the operation of the switching unit shown in Figure 1, it will be appreciated that, in the absence of an input signal applied to input winding 11, for instance from a signal source 21, each of transistors 15, 16 and 17 will be nonconductive, and their corresponding contact terminals 18, 19 and 20 will each appear electrically as an open circuit. Upon application of a signal from source 21 to input winding 11, however, a flux change will occur in core 10, inducing voltages in each of output windings 12, 13 and 14, and these output voltages will in turn inject carriers into the lattice structures of the solid state materials comprising transistors 15, 16 and 17 whereby the said transistors tend to become conductive. For this latter circuit condition, the contacts 18, 19 and 20 tend respectively to assume a "closed" configuration. It will be appreciated that due to the unidirectional conductive characteristics of the transistors 15, 16 and 17, the "closure" of the said contacts 18, 19 and 20 does not correspond precisely to the switching of relay contacts, and the said closed contacts in fact appear, electrically, as a pair of relay contacts having a diode across them. It will further be appreciated that inasmuch as the transistors 15, 16 and 17 are actuated by floating windings 12, 13 and 14, the output contacts 18, 19 and 20 also float in potential, whereby the said contacts on plural switching units, generally of the type illustrated in Figure 1, can be interconnected in various series, parallel, and series-parallel configurations, thereby to produce any desired logical array.

Operation of the switch, as described above, contemplates a flux change in core 10 in response to an input signal at the input winding thereof; and the said core 10 may in fact assume either a substantially linear or a substantially rectangular hysteretic configuration. The choice of core material, comprising any given switching unit, will in fact be largely determined by the duty cycle of switching pulses coupled to the input winding 11; and such signals, upon being applied to winding 11, will, as is well known, cause core 10 to describe a predetermined traverse of its hysteresis loop. If the core 10 exhibits a substantially linear hysteretic configuration, application of input signals thereto will cause the core to move up or down its hysteresis loop; and such linear core materials may accordingly be employed if the duty cycle of input pulses and the circuit logic of an overall control configuration provides a sufficient "off" time to permit the transformer comprising core 10 to recover during the said off periods.

For long duty cycles, however, it may be preferable to employ a core 10 exhibiting a substantially rectangular hysteresis loop; and when such core materials are employed an appreciable voltage is induced in windings 12, 13 and 14 when the said core moves through an unsaturated portion of its hysteresis loop, while substantially no voltage is induced in the said windings 12 through 14 when the core is caused to traverse a substantially saturated portion of its hysteresis loop. For such long duty cycles wherein a relatively short "off time" period may be provided, the switching unit illustrated in Figure 1 may be associated with a source of reverting current for returning the core quickly to a desired hysteretic operating point prior to subsequent application of a further input signal to winding 11; and this reverting current may, if desired, be coupled via appropriate decoupling circuits either to an independent reverting winding on core 10 or to one of the circuit windings already on the said core 10.

By reason of the floating nature of the several output contacts of each switching unit, plural such contacts may be interconnected in various configurations thereby to produce various logical circuits. It will be appreciated that any given logical circuit can in fact comprise an interconnected chain of gates and buffers; and Figure 2 illustrates one such typical gate-buffer chain which can be utilized as a portion of any desired logical circuit.

Figure 2:
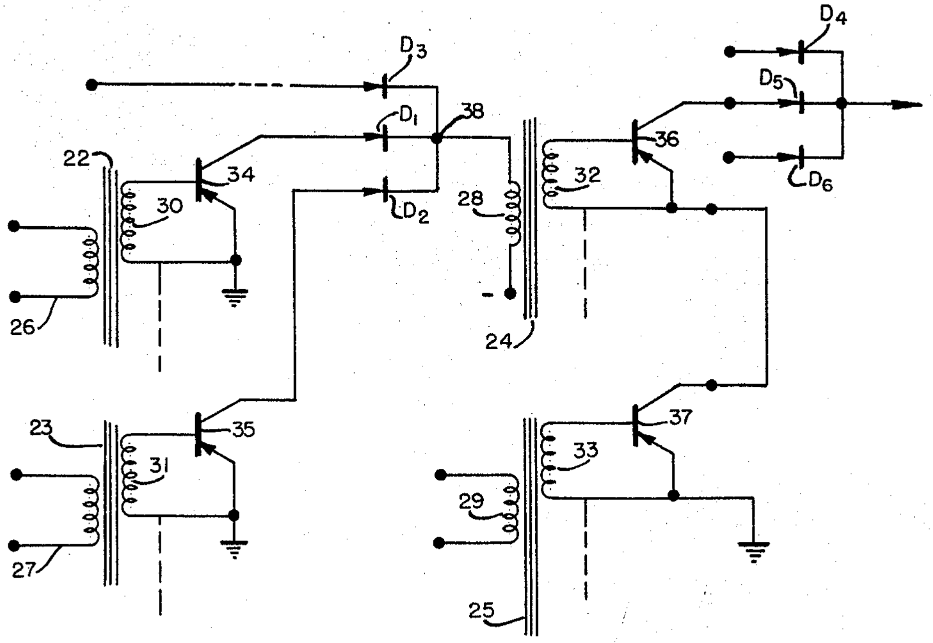
Figure 2 is a schematic diagram of plural units generally of the type illustrated in Figure 1, interconnected to effect a gate-buffer chain.

Thus, referring to Figure 2, it will be seen that in accordance with the present invention, a gate-buffer chain may comprise, for instance, a plurality of switching units such as those employing cores 22, 23, 24 and 25. The said cores each have at least one input winding, such as 26, 27, 28 and 29, and the said cores further have one or more output windings, illustrated respectively as 30, 31, 32 and 33, coupled in the manner already described in reference to Figure 1, to transistors such as 34, 35, 36 and 37. As will be apparent from the following discussion, only one output winding has been illustrated in association with each of the switching units of Figure 2, but in fact the said switching units may each include plural output windings with the other of said output windings being interconnected in various other configurations, in accordance with the desired overall logic of the circuit, or with the said other windings being unutilized in a given circuit.

In the arrangement of Figure 2, the collectors of transistors 34 and 35 are coupled, via rectifiers D1 and D2 respectively, to a terminal 38; and the terminal 38 in turn is connected to one end of input winding 28 on core 24. The said transistors 34 and 35 are, as is apparent from the circuit in Figure 2, effectively connected in parallel to one another whereby this parallel connection of transistors acts as a buffer circuit, and an input signal applied at either one or both of input windings 26 and 27 will in turn produce a signal at terminal 38 which may be coupled to winding 28. Further buffed inputs may be derived from other sources, including the outputs of switching units similar to those already described, and such further buffed inputs may be coupled, for instance via rectifiers such as D3, to the said terminal 38. A signal appearing at terminal 38 and coupled to input winding 28 on core 24 will, as has been described, tend to render transistor 36 conductive.

The circuit of Figure 2 further illustrates the interconnection of the aforementioned floating contact points on plural switching units to effect a gating function; and in particular, it will be noted that transistors 36 and 37 are connected in series with one another. Application of an input signal to winding 28 only will therefore effect no output from the collector of transistor 36, and in fact, a coincident application of signals to input windings 28 and 29 is required to complete a series conductive path between transistors 36 and 37. In response to such coincident application of input signals, a gated output is achieved and this gated output may be coupled to one input of a further buffer, comprising for instance rectifiers D4, D5, D6, etc.

To summarize the foregoing, therefore, it will be seen that in accordance with the present invention, plural transistors on separate switching units, constructed in accordance with the present invention, may be readily interconnected in parallel with one another thereby to provide a buffer circuit; and similarly, plural transistors on separate switching units may be interconnected in series with one another to effect a gating circuit. Such gating and buffing circuits may in turn be interconnected in various configurations to perform any desired logical function.

Figures 3A, 3B:
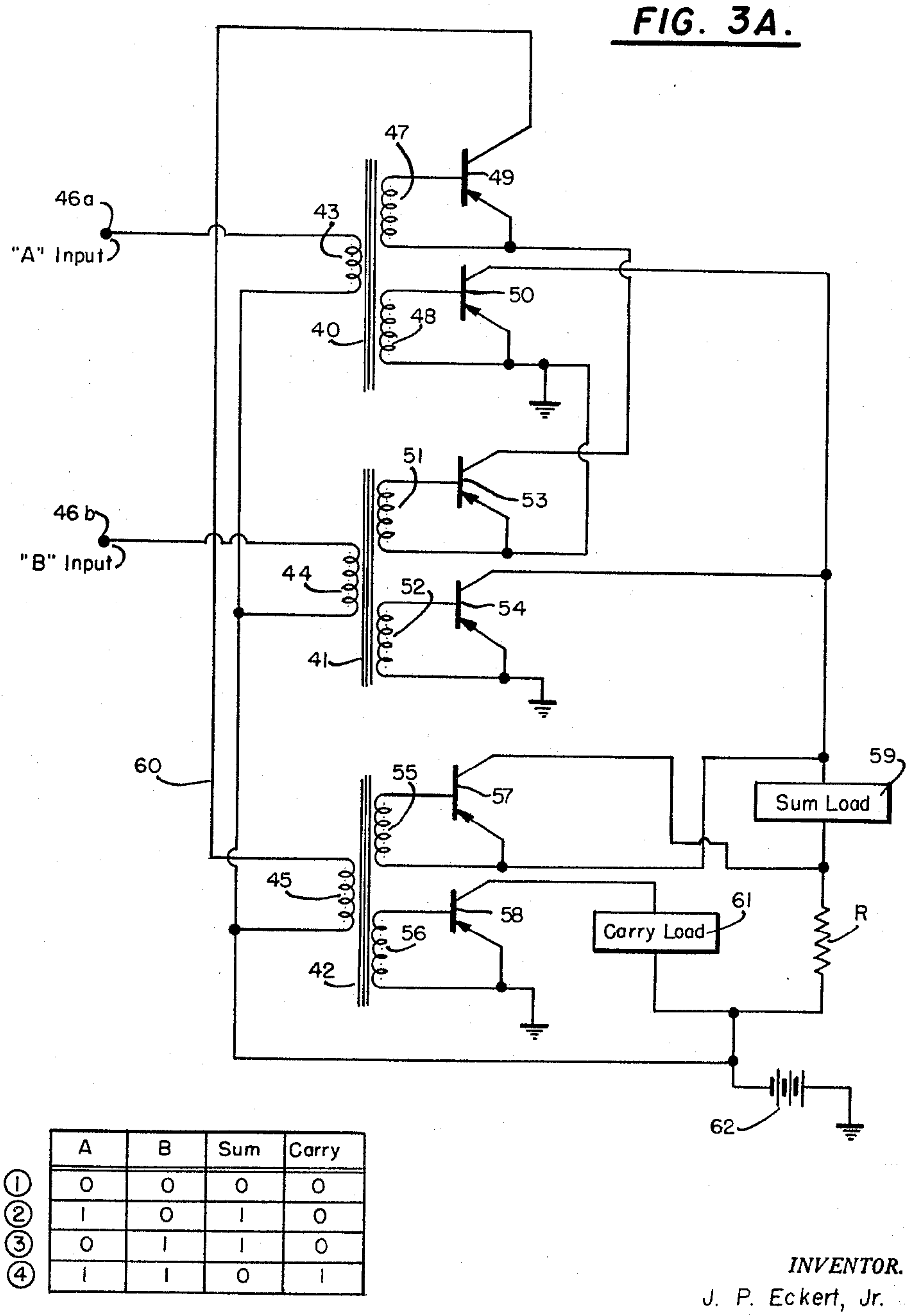
Figure 3A illustrates a further gate-buffer interconnection of switching elements in accordance with the present invention whereby the interconnected circuits acts as a binary half adder.
Figure 3B is a truth table illustrating the operation of the circuit shown in Figure 3A.

In accordance with the present invention, a logical circuit adapted to perform a half addition function, such as may be required in various binary computations, is illustrated in Figure 3A, and the truth table, representing the operation of the circuit shown in Figure 3A, is given in Figure 3B. It must be understood that while the half adder shown in Figure 3A comprises a particularly desirable circuit constructed in accordance with the present invention, the circuit of Figure 3A is, in a broader sense, meant to be merely illustrative of one logical circuit comprising interconnected switching untis constructed in accordance with the present invention. Inasmuch as the circuit of Figure 3A, as will be described, comprises in essence interconnected gate and buffer circuits of the type shown and described in Figure 2, and inasmuch further as substantially any logical configuration may be produced by appropriate interconnection of such gates and buffers, it will be appreciated by those skilled in the art that other logical configurations such as may be desired, can be readily effected by appropriate interconnection of my improved switching units.

Referring initially to Figure 3B, it will be seen that the function of half addition contemplates a sum of "1" and a carry of "0" in response to presence of one only of two possible inputs. Coincident absence of the said two possible inputs produces a sum of "0" and a carry of "0"; while coincident presence of two possible inputs produces a sum of "0" and a carry of "1." The circuit of Figure 3A, which utilizes switching units constructed in accordance with the present invention, does in fact operate in accordance with this binary logic.

Referring particularly to the circuit of Figure 3A, it will be seen that in accordance with the present invention, a half adder may comprise a plurality of cores 40, 41 and 42, which have input windings 43, 44 and 45 thereon respectively. Input windings 43 and 44 are coupled to input terminals 46*a* and 46*b* comprising respectively the designated "A" and "B" inputs to the half adder. Core 40 has a pair of output windings 47 and 48 thereon, coupled respectively to transistors 49 and 50. Core 41 has a pair of output windings 51 and 52 thereon, coupled respectively to transistors 53 and 54; and similarly, core 42 has a pair of output windings 55 and 56 thereon, coupled respectively to transistors 57 and 58.

Transistors 50 and 54 on the first and second switching units respectively, are coupled in parallel with one another whereby the said transistors 50 and 54 comprise a buffer connected to one end of a sum load 59. Transistors 49 and 53 on the said first and second switching units are connected in series with one another whereby the said transistors 49 and 53 act as a gate having an output thereof coupled via line 60 to input winding 45 on the third switching unit. Transistor 57 of the said third switching unit is coupled across the aforementioned sum load 59, while transistor 58 of the said third switching unit is coupled to a carry load 61. An energization source 62 is also provided, and the function of this source will become apparent from the following discussion.

Referring now to the overall operation of the circuit shown in Figure 3A, let us assume initially, that no inputs are applied to either of the input terminals 46*a* or 46*b*. For this initial operating condition, all of the transistors 49—50, 53—54 and 57—58, will be non-conductive, whereby no signal appears at either of loads 59 or 61; and case 1 of the truth table is satisfied. Upon application of an "A" input at terminal 46*a*, both transistors 49 and 50 will be rendered conductive. No signal may pass via transistor 49 to input winding 45. however, inasmuch as transistor 53 in series therewith is still non-conductive. However, the conduction of transistor 50 effects closure of a series circuit which includes source 62, current limiting resistor R, sum load 59, and the said transistor 50, whereby a signal appears in sum load 59. No signal appears at carry load 61, however, since transistor 58 is still non-conductive, and accordingly, case 2 of the truth table is satisfied. An analogous operation occurs in response to application of an input signal at "B" input terminal 46*b*; and for this latter operating condition the conductivity of transistor 54, which is in parallel with the aforementioned transistor 50, completes the desired circuit through sum load 59, whereby case 3 of the truth table is satisfied.

Upon coincident application of "A" and "B" inputs at terminals 46*a* and 46*b*, all of transistors 49, 50, 53 and 54 will be rendered conductive. The gated output thus provided by the simultaneous conductivity of transistors 49 and 53 thereby effects a signal input to winding 45 whereby transistors 57 and 58 are also rendered conductive. As before, the conduction of transistors 50 and 54 tends to complete a circuit through sum load 59; but inasmuch as transistor 57 is now conductive, the said transistor 57 tends to act as a short-circuit across sum load 59 whereby current from source 62, rather than passing through sum load 59, is bypassed via transistor 57. There is no signal, accordingly, at sum load 59. Conduction of transistor 58 completes a series circuit from source 62 through carry load 61 whereby a signal does appear at load 61. Thus, case 4 of the truth table is satisfied.

As will be seen from the foregoing discussion, therefore, one logical circuit comprising a half adder may be readily constructed by appropriate interconnection of the switching units of the present invention. It will be noted that this logical circuit has been effected by appropriate interconnection of identical switchng units whereby the said interconnected switching units provide both gating and buffing functions; and this feature, namely the identity of switching units which may be interconnected to effect any desired logical configuration, provides a very appreciable advantage over devices suggested heretofore wherein plural diverse circuit constructions were required to effect any desired logical function.

The preceding discussion has assumed throughout that the transistors employed in my switching elements comprise PNP type transistors. This, of course, is not mandatory, and in fact NPN transistors may be employed by appropriate attention to the several potentials present. In addition, the particular circuits illustrated have contemplated that the output winding of any given transistor be connected between the emitter and base of a transistor whereby the floating contact points comprise the emitter and collector of the transistor. While this particular configuration is in fact highly desired, various modifications in the particular interconnection of transistor electrodes and switching unit output windings can be effected without departing from the present invention.

It must accordingly be stressed that the foregoing discussion is meant to be illustrative only and should not be considered limitative of my invention, and all such modifications and variations as are in accord with the principles described are meant to fall within the scope of the appended claim.

Having thus described my invention, I claim:

A half adder comprising first, second and third cores of magnetic material, each of said cores having at least one input winding and at least two output windings thereon, a plurality of transistors each of which has a base and an emitter coupled respectively to spaced points on a different one of said output windings, each of said transistors further including a collector, coupling means between the emitters and collectors of preselected ones of said transistors of said first and second cores connecting said preselected transistors in parallel with one another thereby to effect a buffer circuit, a first load connected to an output of said buffer circuit to receive currents from said preselected transistors, coupling means between the emitters and collectors of preselected others of said transistors of said first and second cores connecting said preselected other transistors in series with one another thereby to effect a gating circuit, means coupling an output of said gating circuit to the input winding of said third core, means coupling one of said transistors of said third core to said first load, a second load coupled to receive currents from another of said transistors of said third core, and means for selectively applying control signals to the input windings of said first and second cores.

References Cited in the file of this patent

UNITED STATES PATENTS

| | | |
|---|---|---|
| 2,594,449 | Kircher | Apr. 29, 1952 |
| 2,644,892 | Gehman | July 7, 1953 |
| 2,693,907 | Tootill | Nov. 9, 1954 |
| 2,773,200 | Guggi | Dec. 4, 1956 |
| 2,783,384 | Bright et al. | Feb. 26, 1957 |
| 2,808,990 | Van Allen | Oct. 8, 1957 |

FOREIGN PATENTS

| | | |
|---|---|---|
| 172,350 | Great Britain | Dec. 6, 1921 |

OTHER REFERENCES

Electronics, June 1955, pp.132–136, "Directly Coupled Transistor Circuits," by Beter et al.

Arithmetic Operations in Digital Computers, D. Van Nostrand Co. Inc., Princeton, N. J., 1955, by R. K. Richards, page 132.

What's Inside Transac by A. L. Cavalieri, Electronic Design, vol. 4, No. 13, pages 22–25, July 1, 1956, and vol. 4, No. 14, July 15, 1956, pages 30–33.